(12) United States Patent
Fukano et al.

(10) Patent No.: US 6,416,929 B2
(45) Date of Patent: *Jul. 9, 2002

(54) MEMORY MEMBER

(75) Inventors: Tatsuo Fukano; Yasuhiko Takeda; Naohiko Kato; Tomoyoshi Motohiro, all of Aichi (JP)

(73) Assignee: Kabushiki Kaisha Toyota Chuo Kenkyusho, Aichi-gun (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,927

(22) PCT Filed: Oct. 15, 1998

(86) PCT No.: PCT/JP98/04675

§ 371 (c)(1),
(2), (4) Date: Jun. 17, 1999

(87) PCT Pub. No.: WO99/20472

PCT Pub. Date: Apr. 29, 1999

(30) Foreign Application Priority Data

Oct. 17, 1997 (JP) ............................................. 9-285670

(51) Int. Cl.[7] .............................. B41M 5/26; G11B 7/24
(52) U.S. Cl. .................. 430/270.12; 430/945; 369/288; 369/284
(58) Field of Search ........................... 430/945, 270.12; 369/288, 284

(56) References Cited

U.S. PATENT DOCUMENTS 3,831,179 A * 8/1974 Brill et al. ................ 346/135.1
3,959,799 A * 5/1976 Gambino et al. ........... 430/945

(List continued on next page.)

FOREIGN PATENT DOCUMENTS

| JP | 54-133134 A | 10/1979 |
|---|---|---|
| JP | 57-208299 A | 12/1982 |
| JP | 58-9234 | 1/1983 |
| JP | 60-99699 | 6/1985 |
| JP | 60-219097 | * 11/1985 |
| JP | 2-215587 A | 8/1990 |
| JP | 3-258590 A | 11/1991 |

OTHER PUBLICATIONS

Balakir, E.A., et al., "Combustion rate of exothermic mixtures", Fiz, Goreniya Vzryva vol. 11(1) pp. 43–46, 1975.*
Merck Index Tenth ed. Front Cover, 1983.*

(List continued on next page.)

Primary Examiner—Martin Angebranndt
(74) Attorney, Agent, or Firm—Oblon, Spivak, McClelland, Maier & Neustadt, P.C.

(57) ABSTRACT

A recording medium includes a first substance and a second substance at least in which the first and second substances undergo an oxidation-reduction reaction when an external energy is applied, thereby recording information by varying the optical characteristics. In the recording medium, the reaction of the first and second substances is suppressed, reaction which degrades the recording characteristics other than the case where the recording medium is subjected to recording. In an optical disk 100 (i.e., the recording medium), a $WO_3$ film 2 (i.e., a second substance), a C film 3 (i.e., a third substance) and an Sn-10 atomic % Sr film 4 (i.e., a first substance) are formed successively on a substrate 1. When the recording medium is irradiated with a recording laser beam as an external energy, the $WO_3$ forming the film 2 is reduced to $WO_{2.83}$, and the Sn-10 atomic % Sr forming the film 4 is oxidized to SrO and/or SnO mainly with the $WO_3$ and the Sn-10 atomic % Sr passing through the C film 3 and/or destroying the C film 3. When the recording medium is not irradiated with the recording laser beam, the presence of the C film 3 suppresses the reaction between the $WO_3$ film 2 and the Sn-10 atomic % Sr film 4.

37 Claims, 4 Drawing Sheets

1 : SUBSTRATE
2 : $WO_3$ FILM
3 : C FILM
4 : Sn-10 ATOMIC% Sr FILM
10 : RECORDING FILM
100 : OPTICAL DISK

U.S. PATENT DOCUMENTS

| | | | | |
|---|---|---|---|---|
| 4,477,819 A | * | 10/1984 | Lee et al. | 430/270.12 |
| 4,772,897 A | * | 9/1988 | Ohkawa | 430/270.12 |
| 4,845,515 A | * | 7/1989 | Suh | 430/270.12 |
| 5,266,132 A | * | 11/1993 | Danen et al. | 149/15 |
| 5,459,018 A | | 10/1995 | Akahira | 430/945 |
| 5,491,003 A | | 2/1996 | Akahira | 430/945 |
| 5,786,129 A | * | 7/1998 | Ellis | 430/302 |
| 6,045,889 A | * | 4/2000 | Fukano et al. | 430/270.12 |

OTHER PUBLICATIONS

Balakir, et al. "combustion rate of exothermic mixtures", Fiz. Goreniya Vzryva, 11(1) pp. 43–46, 1975.*

Patent Abstracts of Japan, vol. 017, No. 149 (P–1509), Mar. 24, 1993, JP 4–319545, Nov. 10, 1992.

Derwent Abstract, AN 85–314063, JP 60–219097, Nov. 1, 1985.

* cited by examiner

FIG. 1

1 : SUBSTRATE
2 : $WO_3$ FILM
3 : C FILM
4 : Sn-10 ATOMIC% Sr FILM
10 : RECORDING FILM
100 : OPTICAL DISK

FIG. 2

| Sample No. | Barrier Layer Thickness | Reflectance at Unrecorded Portions | Recording Laser Power | C/N | Modulation |
|---|---|---|---|---|---|
| 1 | 0.5 nm | 52% | 9 mW | 48 dB | 85% |
| 2 | 1 nm | 60% | 10 mW | 50 dB | 85% |
| 3 | 2 nm | 62% | 10 mW | 50 dB | 80% |
| 4 | 3 nm | 61% | 10 mW | 50 dB | 80% |
| 5 | 5 nm | 58% | 11 mW | 50 dB | 85% |
| 6 (Comp. Ex.) | 0 nm | 42% | 8 mW | 47 dB | 80% |

FIG. 3

| Sample No. | Barrier Layer Thickness | Reflectance at Unrecorded Portions | Recording Laser Power | C/N | Modulation |
|---|---|---|---|---|---|
| 11 | 1 nm | 60% | 6 mW | 51 dB | 85% |
| 12 | 2 nm | 63% | 7 mW | 52 dB | 85% |
| 13 | 3 nm | 62% | 7 mW | 52 dB | 85% |
| 14 (Comp. Ex.) | 0 nm | 45% | 6 mW | 50 dB | 80% |

FIG. 4

| Sample No. | Barrier Layer Thickness | Reflectance at Unrecorded Portions | Recording Laser Power | C/N | Modulation |
|---|---|---|---|---|---|
| 21 | 0.5 nm | 63% | 7 mW | 52 dB | 92% |
| 22 | 1 nm | 63% | 7 mW | 52 dB | 93% |
| 23 | 2 nm | 62% | 8 mW | 53 dB | 93% |
| 24 (Comp. Ex.) | 0 nm | 40% | 6 mW | 50 dB | 90% |

MEMORY MEMBER

TECHNICAL FIELD

The present invention relates to a recording medium which comprises a first substance and a second substance at least, and in which an external energy is applied to at least one of the first and second substances to react with each other, thereby varying their optical characteristics to record information.

BACKGROUND ART

Conventionally, there has been proposed a recording medium which includes a first substance and a second substance, and in which the first and second substances cause an oxidation-reduction reaction by being irradiated with an external energy, for example, a laser beam, thereby varying the optical characteristic to record information.

For example, U.S. Pat. No. 5,459,018 discloses a recording medium in which metal, such as Al and Fe, is used as a first substance, and oxide, such as $TeO_2$ and $In_2O_3$, is used as a second substance. These substances coexist to make a single-layered film, or are laminated alternately to make a laminated film.

By the way, according to the investigation carried out by the inventors of the present invention, when the recording medium utilizes the oxidation-reduction reaction between the first substance and the second substance as set forth in the aforementioned prior art, the reaction of the first and second substances develop in the middle of the film formation because the first and second substances both have reactivities. As a result, there arises a possibility of decreasing overall reflectance. Further, in such a recording medium, the first and second substances react with each other when the external energy is not applied (when information is not recorded). Thus, it is expected that the retention of the recorded information deteriorates due to chronological degradation. In an actual application, it is believed that there arise problems when the recording medium is used as an ordinary recording medium.

Furthermore, according to the further investigation carried out by the inventors of the present invention, in order to obtain high reflectance, it is necessary to use a substance of good reflectance as a substance which carries out the reaction when the external energy is applied (when information is recorded). However, because of the good reflectance, the substance exhibits small absorptance to the external energy. As a result, the substance absorbs less heat which is required for the reaction, because it is of good reflectance. Accordingly, it is preferred that the first and second substances are a combination which shows good reactivity when information is recorded. However, the combination showing good reactivity causes unnecessary reactions when the films are formed as aforementioned or when information is not recorded. Thus, the possibility increases in that the recording characteristics of the recording medium degrade.

The present invention has been developed in view of the aforementioned problems. Therefore, in a recording medium which includes a first substance and a second substance at least, the first and second substances undergoing an oxidation-reduction reaction when an external energy is applied thereto, thereby recording information by varying the optical characteristics, it is therefore an object of the present invention to suppress the reaction of the first and second substances, reaction which degrades the recording characteristics other than the case where the recording medium is subjected to recording.

DISCLOSURE OF INVENTION

While investigating into a recording medium which includes a first substance and a second substance at least, and which record information by varying the optical characteristics by applying an external energy, the present invention has been completed by elaborating the combination of the first substance and the second substance which undergo an oxidation-reduction reaction, and by diligently studying a third substance which suppresses the reactivities of the first and second substances.

For example, the present recording medium is characterised in that it is a recording medium for recording information by varying optical characteristics thereof by applying an external energy thereto, which includes:

a first substance and a second substance which cause an exothermic reaction to vary optical characteristics of said first and second substances when the external energy is applied, said first substance undergoing oxidation in a wide sense; and said second substance undergoing reduction in a wide sense; and a third substance interposed between said first substance and said second substance, enabling said first substance and said second substance to react when said external energy is applied, and suppressing said first substance and said second substance to react when said external energy is not applied.

When the external energy is applied to the present recording medium, the first substance reduces the second substance with the first substance and the second substance passing through the third substance and/or destroying the third substance. And, the first substance itself undergoes the oxidation in a wide sense. Thus, the first substance and the second substance undergo an oxidation-reduction reaction. Due to the reaction, at least a part of the first and second substances vary the optical characteristics, and thereby information is recorded in the present recording medium.

Then, since the third substance is interposed between the first substance and the second substance, the aforementioned oxidation-reduction reaction is suppressed when forming films or when the external energy is not applied (when information is not recorded).

Further, since the oxidation-reduction reaction is an exothermic reaction, the resulting modified reaction products are stable energetically, and the reverse reaction is less likely to occur. Hence, the present recording medium can suppress the reaction between the first and second substances which degrades the recording characteristics.

Said first substance can be at least one member selected from the group consisting of metals, intermetallic compounds, nitrides, carbides, silicides, borides, sulfides, selenides, tellurides, phosphides, arsenides, antimonides and substances containing these members. The members generate an energy of 1,000 kJ or more when bonding with oxygen molecules in an amount of 1 mol (hereinafter referred to as an "oxygen-bonding energy"), and contain at least one element selected from the group consisting of elements of group 1 of the periodic table of the elements, elements of group 2 thereof, elements of group 3 thereof, elements of group 4 thereof, elements of group 5 thereof, Cr, Mn, Zn, Al and Si.

The elements of group 1 can be Li, Na, K, etc. The elements of group 2 can be Mg, Ca, etc. The elements of group 3 can be Sc, Y, etc. The elements of group 4 can be Ti, Zr, etc. The elements of group 5 can be V, Nb, etc.

Said second substance can be at least one member selected from the group consisting of oxides, substances containing oxygen as a constituent element, substances with oxygen adsorbed, compounds thereof or mixtures thereof. The members require an energy of 550 kJ or less when dissociating oxygen molecules in an amount of 1 mol (hereinafter referred to as an "oxygen-dissociating energy").

The second substance gives oxygen to the first substance to oxidize it, and is itself likely to be reduced. The second substance can be a substance containing at least one member selected from the group consisting of oxides and substances containing oxygen as a constituent element. The members contain at least one element selected from the group consisting of elements of group 6 of the periodic table of the elements, elements of group 8 thereof, elements of group 9 thereof, elements of group 11 thereof, Ti, V, Mn, Ni, Re, Ge, Sn, Pb, As, Sb, Bi, Se, Te, Ce, Pr and Tb.

Here, the elements of group 6 can be Cr, Mo, etc. The elements of group 8 can be Fe, Ru, etc. The elements of group 9 can be Co, Rh, Ir, etc. The elements of group 11 can be Cu, Ag, Au, etc.

According to the investigations carried out by the inventors of the present invention, when the oxygen-bonding energy of the first substance is less than 1,000 kJ, the first substance is less likely to bond with the oxygen, and the reactivity decreases. Moreover, when the oxygen-dissociating energy of the second substance is more than 550 kJ, the oxygen is less likely to dissociate, and the reactivity decreases. Accordingly, the first and second substance can preferably have the aforementioned respective energy ranges.

Further, the first substance can be a substance containing at least one member selected from the group consisting of metals, intermetallic compounds, nitrides, carbides, silicides, borides, sulfides, selenides, tellurides, phosphides, arsenides, antimonides and substances containing these members. The members generate an oxygen-bonding energy of 500 kJ or more, and exhibit a melting point or a decomposition temperature of from 100° C. or more to 300° C. or less. And, the second substance can be a substance containing at least one member selected from the group consisting of oxides, substances containing oxygen as a constituent element, substances with oxygen adsorbed, compounds thereof and mixtures thereof. The members require an oxygen-dissociating energy of 550 kJ or less.

Furthermore, the second substance gives oxygen to the first substance to oxidize it, and is itself likely to be reduced. The second substance can be a substance containing at least one member selected from the group consisting of oxidea and substances containing oxygen as a constituent element. The members contain at least one element selected from the group consisting of elements of group 6 of the periodic table of the elements, elements of group 8 thereof, elements of group 9 thereof, elements of group 11 thereof, Ti, V, Mn, Ni, Re, Ge, Sn, Pb, As, Sb, Bi, Se, Te, Ce, Pr and Tb.

Here, the elements of group 6 can be Cr, Mo, etc. The elements of group 8 can be Fe, Ru, etc. The elements of group 9 can be Co, Rh, Ir, etc. The elements of group 11 can be Cu, Ag, Au, etc.

By having the first substance exhibit a melting point or a decomposition temperature in the aforementioned range, the first substance can be turned into a liquid phase by a small external energy. The aforementioned oxidation-reduction reaction is a reaction between the liquid phase and the solid phase so that the reactivity is enhanced compared with the reaction between the solid phases. When the substance constituting the first substance exhibits a melting point or a decomposition temperature of less than 100° C., the heat resistance of recorded data decreases. When the melting point or the decomposition temperature exceeds 300° C., a large external energy is required unpreferably.

Moreover, by having the first substance exhibit a melting point or a decomposition temperature in the aforementioned range, the reactivity is enhanced. Accordingly, the oxygen-bonding energy of the first substance can be decreased, and is 500 kJ or more. According to the investigations carried out by the inventors of the present invention, when the oxygen-bonding energy is less than 500 kJ, the reactivity is decreased unpreferably.

Note that, even when the third substance is interposed, the first substance and the second substance cause the oxidation-reduction reaction, at least a part of the first and second substances are modified to vary the optical characteristics. Thus, information is recorded. And, even when the first substance and the second substance are made into the aforementioned combination of good reactivity, the interposing third substance can suppress the reaction between the first and second substances, reaction which degrades the recording characteristics other than the case where the recording medium is subjected to recording.

BEST MODE FOR CARRYING OUT THE INVENTION (First Preferred Embodiment)

Figure 1:
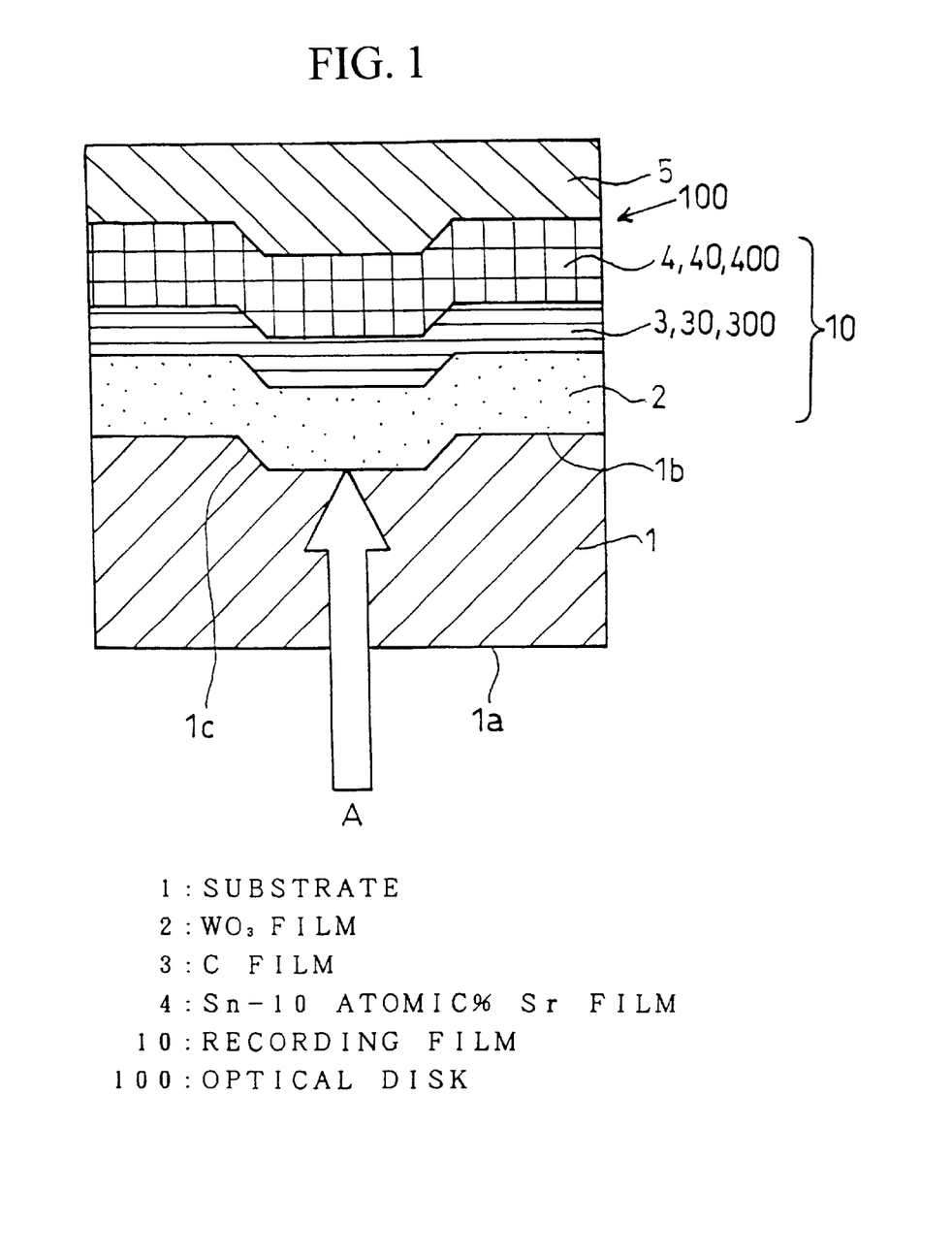
FIG. 1 is an explanatory diagram for illustrating the cross-sectional arrangement of an optical disk according to preferred embodiments of the present invention.

A recording medium of this First Preferred Embodiment is directed to recording information by varying a recording film physically and/or chemically by irradiating it with a recording laser beam as an external energy. For example, it is applicable to an optical disk in which music or data is recorded as information. FIG. 1 illustrates a partial cross-sectional construction of an optical disk (recording medium) 100 of this preferred embodiment.

An optical disk 100 is formed as a disk as a whole, and a plurality of layers are formed and laminated as illustrated in FIG. 1. 1 designates a transparent substrate which is formed as a disk (for example, in a thickness of 1.2 mm) and is made from polycarbonate, for instance. A laser beam for optically recording and reading out information enters from a surface 1a of the substrate 1 in the direction specified by the arrow "A". The surface 1a, the laser-beam-incidence side, is a flat surface, and on the other side 1b, there is formed a spiral or concentric guide groove (track) 1c for leading the laser beam.

On the other surface 1b of the substrate 1, there is formed a $WO_3$ film 2, including $WO_3$ (a second substance), as a second layer. And, on the $WO_3$ film 2, there is formed a C film (carbon film) 3, including carbon (a third substance), as a barrier layer (third layer). On the C film 3, there is formed an Sn-10 atomic % Sr film 4, including Sn-10 atomic % Sr (a first substance), as a first layer. The C film 3 has a thickness (for example, 1 nm or more) which is appropriate for suppressing the physical and/or chemical reaction between the $WO_3$ film 2 and the Sn-10 atomic % Sr film 4.

Here, the aforementioned films 2, 3 and 4 constitute a recording film 10 in the optical disk 100. Moreover, on the Sn-10 atomic % Sr film 4, there is formed a resin film (protective film) 5 which covers the recording film 10 to protect it and includes an ultraviolet-curable resin.

Next, the manufacturing method of the optical disk 100 will be described in detail.

The substrate 1 was prepared. The opposite surface 1a was formed as a flat surface. In the other surface 1b, there was formed the guide groove 1c. The substrate 1 was composed of a disk having a thickness of 1.2 mm, and was made from polycarbonate. On the other surface 1b of the substrate 1, the $WO_3$ film 2 was formed in a thickness of 185 nm by an RF magnetron sputtering method with a $WO_3$ target under the following film forming conditions of sputtering gas species: Ar+10% $O_2$, sputtering gas pressure: $4 \times 10^{-3}$ Torr and input electric power: 100–400 W. Subsequently, the C film 3 was formed in a thickness of 2 nm by an RF magnetron sputtering method with a C (graphite) target under the following film forming conditions of sputtering gas species: Ar, sputtering gas pressure: $4 \times 10^{-3}$ Torr and input electric power: 200–500 W.

Still subsequently, the Sn-10 atomic % Sr film 4 was formed in a thickness of 35 nm by an RF magnetron sputtering method with an Sn-10 atomic % Sr target under the following film forming conditions of sputtering gas species: Ar, sputtering gas pressure: $4 \times 10^{-3}$ Torr and input electric power: 50–200 W.

Finally, the ultraviolet-curable resin was applied by a spin coating method, the ultraviolet-curable resin was cured using a high-pressure mercury-vapor lamp to form the resin film 5 and thus, the optical disk 100 was manufactured.

The recording actions of the optical disk 100 of this preferred embodiment are as hereinafter described. In the portion of the guide groove 1c, the recording laser beam enters (irradiates) in the direction of the arrow "A", and is focused on the surface of the Sn-10 atomic % Sr film 4. Further, the $WO_3$ film 2 and the Sn-10 atomic % Sr film 4 undergo a chemical reaction with the $WO_3$ and the Sn-10 atomic % Sr passing through the C film 3 and/or destroying the C film 3. Accordingly, when the recording laser beam is irradiated (when the external energy is applied), the optical characteristics (reflectance, etc.) of the recording film vary so that information can be recorded.

When the recording laser beam is not irradiated (when the external energy is not applied), since the C film 3 is interposed between the $WO_3$ film 2 and the Sn-10 atomic % Sr film 4, the reaction between the $WO_3$ film 2 and the Sn-10 atomic % Sr film 4 is suppressed, and as a result, the recording characteristics can be inhibited from degrading.

The reaction between the $WO_3$ film 2 and the Sn-10 atomic % Sr film 4 at this time is an oxidation-reduction reaction in a wide sense as hereinafter described. By irradiating with the recording laser beam, the $WO_3$ (the second substance), forming the film 2, is reduced and a part of or all of it is turned into $WO_{2.83}$. The Sn-10 atomic % Sr (the first substance), forming the film 4, is oxidized and a part of or all of it is turned into SrO and/or SnO.

At this moment, the color hues of the substances constituting the films are as follows. The $WO_3$ is transparent, the $WO_{2.83}$ is blue, the Sn-10 atomic % Sr is metallic gloss, the SrO is transparent, and the SnO is gray. Accordingly, the optical characteristics of the optical disk 100 before and after recording vary greatly.

The energy required for the $WO_3$ to dissociate oxygen molecules in an amount of 1 mol and to turn into the $WO_{2.83}$ (oxygen-dissociating energy) is about 480 kJ at room temperature, while the energies generated by the Sr and the Sn to bond with oxygen molecules in an amount of 1 mol and to turn into the SrO and the SnO (oxygen-bonding energy) are about 1,220 kJ and 610 kJ, respectively, at room temperature. Therefore, the reaction between the $WO_3$ film 2 and the Sn-10 atomic % Sr film 4 is an exothermic reaction.

And, in this preferred embodiment, since the oxidation-reduction reaction is an exothermic reaction, the modified reaction products ($WO_{2.83}$, SrO and SnO) are energetically stable, and the reverse reaction is less likely to occur. In addition, since the substances before the generation or after the generation are the oxides or the substance containing oxygen as a constituent element, they are strong against heat and moisture, etc., and are good in environmental resistance. Thus, when information is not recorded, it is likely to suppress the unnecessary reactions.

The specific example of the recording characteristics of this preferred embodiment will be described. In the optical disk 100 which was manufactured by the aforementioned manufacturing method, information was recorded by irradiating the optical disk with a laser beam (recording laser beam) of wavelength: 780 nm from the side of the flat surface (surface 1a), which was focused on the surface of the Sn-10 atomic % Sr film 4 through an objective lens of NA (numerical aperture): 0.5. At this moment, the irradiating conditions were linear velocity: 2.8 m/sec, recording frequency: 400 kHz and recording laser wave form: rectangular wave of 50% duty ratio.

Figure 2:
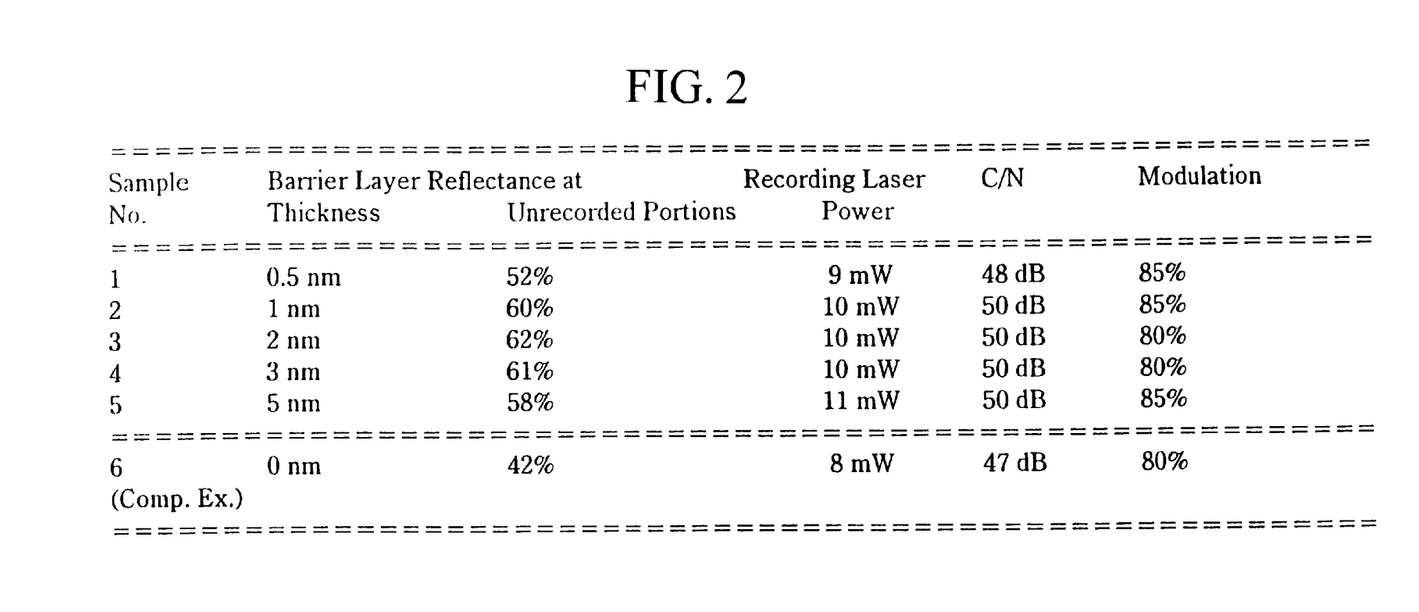
FIG. 2 is a table for summarizing the recording characteristics of optical disks of a First Preferred Embodiment and a comparative example.

The characteristics (recording characteristics) of the optical disk 100 in this instance were, as set forth in Sample No. 3 of FIG. 2, reflectance at unrecorded portions: 62%, recording laser power: 10 mW, C/N (output-level ratio of carrier to noise): 50 dB and modulation: 80%. Note that the modulation is a value which is obtained by subtracting the reflectance after the recording from the reflectance before the recording and dividing the difference by the reflectance before the recording.

Then, the optical disk characteristics as set forth above were measured by variously changing the thickness (in the drawing, denoted as "barrier layer thickness") of the C film 3 playing the role of the barrier layer (Sample Nos. 1, 2, 4 and 5), and FIG. 2 summarizes the results, together with the aforementioned results (Sample No. 3). Note that, in FIG. 2, Sample No. 6 was a comparative example to the present invention, and was free from the barrier layer.

As set forth in FIG. 2, it is understood that the optical disks 100 of this preferred embodiment listed as Sample Nos. 1 through 5 exhibited remarkably higher reflectance than the optical disk of the comparative example (Sample No. 6), and that they were well balanced in terms of the characteristics, such as the reflectance, the recording power, the C/N and the modulation. This results from the arrangement that the reaction between the first layer, the Sn-10 atomic % Sr film 4, and the second layer, the $WO_3$ film 2, is suppressed by the presence of the C film 3.

Moreover, the respective optical disks of Sample Nos. 1 through 6 were subjected to an environmental resistance test which was carried out at 55° C. for 96 hours. The optical disks of this preferred embodiment could read out the recorded data. Whereas, it was impossible for the optical disk of the comparative example to read out the recorded data. This results from the arrangement that the reaction between the $WO_3$ film 2 and the Sn-10 atomic % Sr film 4 is suppressed by the presence of the C film 3.

As described so far, the optical disks 100 of this preferred embodiment are characterized in that they are better balanced in terms of the characteristics, such as the reflectance, the recording power, the C/N and the modulation, than the conventional optical disk.

Moreover, in this preferred embodiment, the C film 3 is interposed between the $WO_3$ film 2 and the Sn-10 atomic % Sr film 4. Accordingly, the reaction is suppressed in the formation of the films, under ordinary environment, and under the high-temperature-and-high humidity conditions such as the aforementioned environmental resistance test. Namely, the reaction is suppressed other than the case where information is recorded, and thus, the recording characteristics (reflectance, recording powder, C/N and modulation) can be inhibited from degrading, and the data retention characteristic can be improved greatly. In addition, the reflectance (initial reflectance) at the unrecorded portions of the optical disk can be heightened remarkably.

By the way, the first and second substances according to the present invention are not limited to the substances of the aforementioned preferred embodiment.

Under the conditions that, the first substance and the second substance make a combination so that a first substance undergoes oxidation in a wide sense and a second substance undergoes reduction, thereby causing an exothermic reaction when an external energy is applied; and that at least a part of the first substance and/or the second substance have varied the optical characteristics before and after the exothermic reaction, the following substances can be employed.

The first substance can be any substance which reduces the second substance by retrieving or the like oxygen from the second substance, and is itself likely to be oxidized. Such a first substance can consist of one member selected from the group consisting of metals, intermetallic compounds, nitrides, carbides, silicides, borides, sulfides, selenides, tellurides, phosphides, arsenides, antimonides and compounds or mixtures thereof (13 kinds so far will be referred to as a substance group "P"), or alternatively, the first substance can be selected from substances containing at least one substance of the substance group "P".

In order to be more likely to bond with oxygen and in order to enhance the reactivity, the first substance can preferably be one substance of the substance group "P" which exhibits the oxygen-bonding energy of 1,000 kJ or more. For example, as the first substance, Sn—Sr alloys, Mg—Al alloys, In—Sr alloys, Al—Ti alloys, etc., which exhibit the oxygen-bonding energy of 1,000 kJ or more, can be employed (The oxygen-bonding energies are approximately Sn: 610 kJ, Sr: 1,220 kJ, Mg: 1,220 kJ, Al: 1,130 kJ, In: 640 kJ and Ti: 1,070 kJ.).

Further, in the aforementioned combination, the second substance can be any substance which oxidizes the first substance, and is itself likely to be reduced, or can alternatively be any substance which causes the first substance to undergo oxidation in a wide sense, in which the oxidation number is increased without directly exchanging oxygen atoms, and is itself reduced. And, the second substance can consist of one member selected from the group consisting of oxides, substances containing oxygen as a constituent element, substances with oxygen adsorbed and compounds or mixtures thereof (4 kinds so far will be referred to as a substance group "Q"), or alternatively, the second substance can be a substance containing at least one of the substance group "Q".

In order to be more likely to dissociate oxygen and in order to enhance the reactivity, the second substance can preferably be one substance of the substance group "Q" which exhibits the oxygen-dissociating energy of 550 kJ or less. For example, as the second substance, $MoO_3$, $ReO_2$, $PrO_2$, $SbO_2$, etc., can be employed (The oxygen-dissociating energies are approximately $MoO_3$: 330 kJ, $ReO_2$: 450 kJ, $PrO_2$: 240 kJ and $SbO_2$: 380 kJ.).

In this preferred embodiment, as the third substance which is interposed between the first substance and the second substance, and which plays a role of suppressing the reaction between the first and second substances other than the case where information is recorded, the following can be employed. First, the third substance can be oxides, such as $Al_2O_3$, SiAlON, etc., substances containing oxygen as a constituent element, substances with oxygen adsorbed, or compounds thereof or mixtures thereof, which generate a quantity of heat in excess of 550 kJ when dissociating oxygen molecules in an amount of 1 mol. The substance, which generates a quantity of heat in excess of 550 kJ when dissociating oxygen molecules in an amount of 1 mol, can be preferable, because there is possibility that the reaction between the first substance and the second or third substance gradually develops when information is not recorded, if the substance generates a quantity of heat 550 kJ or less when dissociating oxygen molecules in an amount of 1 mol.

Further, the third substance can be an organic substance, such as $C_mH_n$ (hydrocarbon), $C_mF_n$, $C_mH_nF_p$ or the like (m, n and p are integers), which exhibits a decomposition temperature (a decomposition, sublimation or melting temperature) of 300° C. or less. Among organic substances, the organic substance, which exhibits a decomposition temperature (a decomposition, sublimation or melting temperature) of 300° C. or less, can be preferable, because a laser beam power, which is applied when recording information, should be increased, if an organic substance exhibits a decomposition temperature of more than 300° C., and thus, such an organic substance is not so practical for a recording medium.

Furthermore, the third substance can preferably be a substance which includes at least one member selected from the group consisting of metals, such as Mn, Ti, Se, Mn steels, titanium alloys, Si, Ge, $SiN_x$, etc., semiconductors, intermetallic compounds, nitrides, carbides, silicides, borides, sulfides, selenides, tellurides, phosphides, arsenides, antimonides and substances containing these members, which exhibit a thermal diffusion coefficient of 50 $mm^2$/sec or less in bulk at room temperature. Among these substances, the substance, which exhibits a thermal diffusion coefficient of 50 $mm^2$/sec or less in bulk at room temperature, can be preferable, because a laser beam power, which is applied when recording information, should be increased, if a substance exhibits a thermal diffusion coefficient of more than 50 $mm^2$/sec, and thus such, a substance is not so practical for a recording medium.

Moreover, the third substance can preferably exhibit a melting point, a decomposition temperature or a sublimation temperature of 1,000° C. or more in the case where it generates an energy of 1,000 kJ or more when bonding with oxygen molecules in an amount of 1 mol; or can exhibit a melting point, a decomposition temperature or a sublimation temperature of 300° C. or more in the case where it generates an energy of less than 1,000 kJ when bonding with oxygen molecules in an amount of 1 mol. This is because there is a possibility that the first substance reacts with the third substance when information is not recorded, especially when producing the recording medium, depending on the production conditions.

The thickness of the third substance layer can be selected so that it satisfies the required characteristics of the recording medium. However, the thickness can preferably be 0.5 nm or more in order to bring out the characteristics of the third substance as the barrier layer.

(Second Preferred Embodiment)

In the optical disk 100 illustrated in FIG. 1, this Second Preferred Embodiment differs from the recording medium of the aforementioned First Preferred Embodiment in that the first layer is an Sn-43 atomic % Bi film 40 instead of the Sn-10 atomic % Sr film, and in that the barrier layer is a hydrocarbon film 30 instead of the C film. The recording medium of this preferred embodiment operates and effects advantages in the substantially same manner as the recording medium of the aforementioned First Preferred Embodiment. Hereinafter, the portions, which differ from those of the recording medium of the First Preferred Embodiment, will be described mainly.

The manufacturing method of the recording medium of this preferred embodiment will be described with reference to a specific example.

On the surface 1b of the substrate 1, the $WO_3$ film 2 was formed in a thickness of 185 nm by an RF magnetron sputtering method with a $WO_3$ target under the following film forming conditions of sputtering gas species: Ar+10% $O_2$, sputtering gas pressure: $4 \times 10^{-3}$ Torr and input electric power: 100–400 W.

Subsequently, the hydrocarbon film 30 was formed in a thickness of 2 nm by an RF magnetron sputtering method with a C (graphite) target under the following film forming conditions of sputtering gas species: Ar+50% $C_3H_6$ (propylene), sputtering gas pressure: $4 \times 10^{-3}$ Torr and input electric power: 200–500 W. Still subsequently, the Sn-43 atomic % Bi film 40 was formed in a thickness of 45 nm by an RF magnetron sputtering method with an Sn-43 atomic % Bi target under the following film forming conditions of sputtering gas species: Ar, sputtering gas pressure: $4 \times 10^{-3}$ Torr and input electric power: 50–200 W.

Finally, the ultraviolet-curable resin was applied by a spin coating method, and it was cured using a high-pressure mercury-vapor lamp to form the resin film 5, thereby obtaining the optical disk 100.

The recording actions of the optical disk 100 of this preferred embodiment are assumed to be as follows. In the portion of the guide groove 1c, the recording laser beam enters (irradiates) in the direction of the arrow "A", and is focused on the surface of the Sn-43 atomic % Bi film 40. Since the melting point of the Sn-43 atomic % Bi film 40 is as low as about 139° C., a part of or all of the Sn-43 atomic % Bi film 40, which is irradiated with the laser beam, melts, and in a certain case, holes are formed in the Sn-43 atomic % Bi film 40 in this instance.

Simultaneously therewith, the $WO_3$ film 2 and the Sn-43 atomic % Bi film 40, a part of or all of which melts, undergo a chemical reaction with the $WO_3$ and the Sn-43 atomic % Bi passing through the hydrocarbon film 30 and/or decomposing, sublimating, melting or destroying the hydrocarbon film 30. Accordingly, the optical characteristics (reflectance, etc.) of the recording film vary so that information can be recorded. Since the chemical reaction occurs between the molten liquid and the solid, the reaction occurs more easily than the case where the reaction occurs between a solid and the other solid.

When the recording laser beam is not irradiated, since the hydrocarbon film 30 is interposed between the $WO_3$ film 2 and the Sn-43 atomic % Bi film 40, the reaction between the $WO_3$ film 2 and the Sn-43 atomic % Bi film 40 is suppressed. As a result, the recording characteristics can be inhibited from degrading.

Note that the decomposition temperature (the decomposition, sublimation or melting temperature) of the organic substance used as the barrier layer (the hydrocarbon film 30 in this preferred embodiment) can preferably be 300° C. or less. When it is more than 300° C., a laser beam power, which is applied when recording information, should be increased. Accordingly, such an organic substance is not so practical for a recording medium. According to the results of a thermal analysis, the decomposition temperature (the decomposition, sublimation or melting temperature) of the hydrocarbon film 30 used as the barrier layer in this preferred embodiment is assumed to fall in the range of from 100 to 200° C.

Moreover, in the aforementioned preferred embodiment, an Al alloy containing Ti in an amount of less than 30 atomic % can be used as the first layer.

The reaction between the $WO_3$ film 2 and the Sn-43 atomic % Bi film 40 herein is also an oxidation-reduction reaction in a wide sense as hereinafter described. By irradiating with the recording laser beam, the $WO_3$ (the second substance), forming the film 2, is reduced, and a part of or all of it is turned into $WO_{2.83}$. The Sn-43 atomic % Bi (the first substance), forming the film 40, is oxidized, and mainly a part of or all of Sn is chiefly turned into SnO.

At this moment, the color hues of the substances constituting the films are as follows. The $WO_3$ is transparent, the $WO_{2.83}$ is blue, the Sn-43 atomic % Bi is metallic gloss, and the SnO is gray. Accordingly, the optical characteristics of the optical disk 100 before and after recording vary greatly.

The energy required for the $WO_3$ to dissociate oxygen molecules in an amount of 1 mol and to turn into the $WO_{2.83}$ (oxygen-dissociating energy) is about 480 kJ at room temperature. The energy generated by the Sn to bond with oxygen molecules in an amount of 1 mol and to turn into the SnO (oxygen-bonding energy) is about 610 kJ at room temperature. Therefore, the reaction between the $WO_3$ film 2 and the Sn-43 atomic % Bi film 40 is an exothermic reaction. By the way, the oxygen-bonding energy required for Bi to turn into $Bi_2O_3$ is about 410 kJ at room temperature.

At this moment, in this preferred embodiment, compared with the aforementioned First Preferred Embodiment, the substance to be reduced, the Sn-43 atomic % Bi exhibits a much smaller oxygen-bonding energy than the Sn-10 atomic % Sr. Namely, the difference between the oxygen-bonding energy of the Sn-43 atomic % and the oxygen-dissociating energy of $WO_3$, which is required for $WO_3$ to turn into $WO_{2.83}$, is much smaller than the case of Sn-10 atomic % Sr. The reason, for which the similar recording action is induced even if the energy is less, is believed as follows.

Namely, when recording, a part of or all of the Sn-43 atomic % Bi, which exhibits a low melting point, melts, and in a certain case, holes are formed in the Sn-43 atomic % Bi film 40 in this instance. It is believed that, since the chemical reaction at this moment is a reaction between the molten liquid and the solid, the reaction occurs more easily than the case where the reaction occurs between a solid and the other solid.

Moreover, in this preferred embodiment as well, since the aforementioned oxidation-reduction reaction is an exothermic reaction, the modified reaction products ($WO_{2.83}$ and SnO) are stable energetically, and the reverse reaction is less likely to occur. In addition, since the substances before the generation or after the generation are the oxides or the substance containing oxygen as a constituent element, they are strong against heat and moisture, etc., and are good in environmental resistance. Thus, when information is not recorded, it is likely to suppress the unnecessary reactions.

The specific example of the recording characteristics of this preferred embodiment will be described. In the optical disk 100 which was manufactured by the aforementioned manufacturing method, information was recorded by irradiating with a laser beam (recording laser beam) of wavelength: 780 nm from the side of the flat surface (surface 1a), which was focused on the surface of the Sn-43 atomic % Bi film 40 through an objective lens of NA (numerical aperture): 0.5. At this moment, the irradiating conditions were linear velocity: 2.8 m/sec, recording frequency: 400 kHz and recording laser wave form: rectangular wave of 50% duty ratio.

Figure 3:
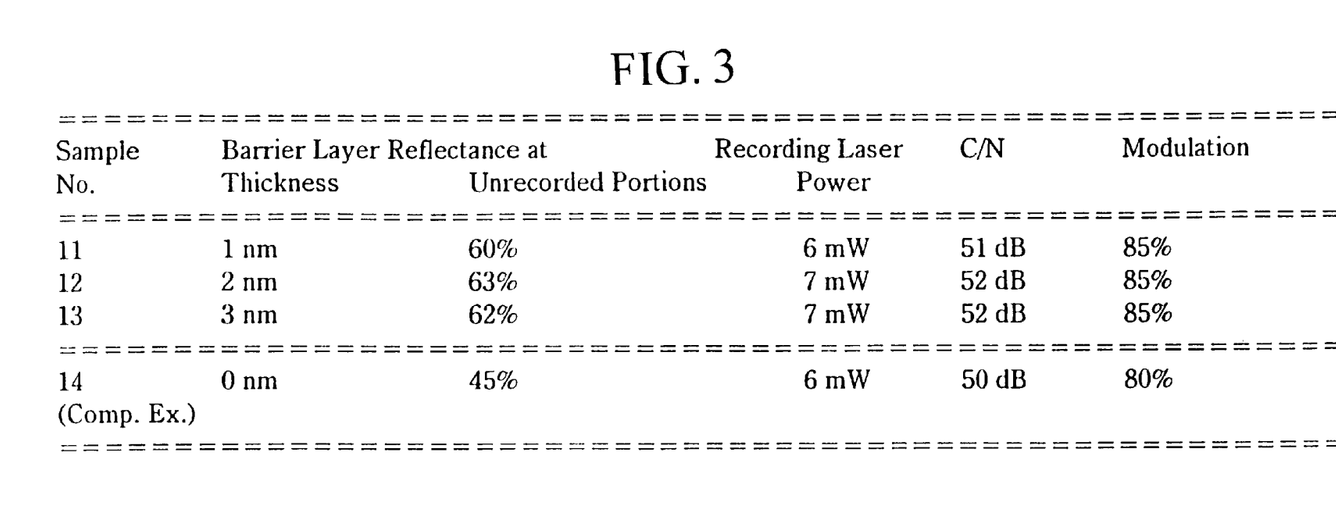
FIG. 3 is a table for summarizing the recording characteristics of optical disks of a Second Preferred Embodiment and a comparative example.

The characteristics (recording characteristics) of the optical disk in this instance were, as set forth in Sample No. 12 of FIG. 3, reflectance at unrecorded portions: 63%, recording laser power: 7 mW, C/N: 52 dB and modulation: 85%.

Then, the optical disk characteristics as set forth above were measured by various changing the thickness (in the drawing, denoted as "barrier layer thickness") of the hydrocarbon film 30 playing the role of the barrier layer (Sample Nos. 11 and 13), and FIG. 3 summarizes the results, together with the aforementioned results (Sample No. 12). Note that, in FIG. 3, Sample No. 14 was a comparative example to the present invention, and was free from the barrier layer.

As set forth in FIG. 3, it is understood that the optical disks 100 of this preferred embodiment listed as Sample Nos. 11 through 13 exhibited remarkably higher reflectance than the optical disk of the comparative example (Sample No. 14), and that they were well balanced in terms of the characteristics, such as the reflectance, the recording power, the C/N and the modulation. This results from the arrangement that the reaction between the first layer, the Sn-43 atomic % Bi film 40, and the second layer, the $WO_3$ film 2, is suppressed by the presence of the hydrocarbon film 30.

Moreover, the respective optical disks of Sample Nos. 11 through 14 were subjected to an environmental resistance test which was carried out at 55° C. for 96 hours. The optical disks of this preferred embodiment could read out the recorded data. Whereas, it was impossible for the optical disk of the comparative example to read out the recorded data. This results from the arrangement that the reaction between the $WO_3$ film 2 and the Sn-43 atomic % Bi film 40 is suppressed by the presence of the hydrocarbon film 30.

As described so far, the optical disks 100 of this preferred embodiment are characterized in that they are better balanced in terms of the characteristics, such as the reflectance, the recording power, the C/N and the modulation, than the conventional optical disk.

Moreover, in this preferred embodiment, the hydrocarbon film 30 is interposed between the $WO_3$ film 2 and the Sn-43 atomic % Bi film 40. Accordingly, the reaction is suppressed in the formation of the films, under ordinary environment, and under the high-temperature-and-high humidity conditions such as the aforementioned environmental resistance test. Namely, the reaction is suppressed other than the case where information is recorded. Thus, the reflectance (initial reflectance) at the unrecorded portions of the optical disk can be heightened remarkably, and the recording characteristics (reflectance, recording powder, C/N and modulation) can be inhibited from degrading. In addition, the data retention characteristic can be improved greatly.

By the way, in this preferred embodiment as well, the first and second substances are not limited to the substances of the aforementioned example. Under the conditions that as far as the combination set forth in the aforementioned First Preferred Embodiment is satisfied, the following substances can be employed.

The first substance can be any substance which reduces the second substance by retrieving or the like oxygen from the second substance, and is itself likely to be oxidized. The first substance employed herein can be at least one substance of the substance group "P", exhibit an oxygen-bonding energy of 500 kJ or more, and have a melting point or a decomposition temperature of from 100° C. or more to 300° C. or less.

Such a first substance employed herein can be an Au—Ag—Sn alloy (for example, composition ratio: Au-5.7 atomic % Ag-82 atomic % Sn, melting point: about 240° C.), an Au—Ga—Sn alloy (for example, composition ratio: Au-10 atomic % Ga-18 atomic % Sn, melting point: about 260° C.), etc., which exhibit an oxygen-bonding energy of 500 kJ or more. Here, the oxygen-bonding energies are approximately Au: 30 kJ, Ag: 130 kJ, Sn: 610 kJ and Ga: 740 kJ.

The first layer employed herein can be an In-48.3 atomic % Sn film. This layer has a melting point of 120° C. The oxygen-bonding energies are about 640 kJ for In and about 610 kJ for Sn.

The second and third substances employed herein can be the same as those of the aforementioned First Preferred Embodiment.

Here, a variety of recording media are disclosed in the aforementioned conventional publications. Many of them, however, have recording films of low reflectance. Moreover, even when they have recording films in which Al of high reflectance is a major component, since Al of high reflectance is a major component in the recording portions, the reflectance at the recording portions is not reduced so much. Consequently, it is believed that they exhibit small modulations.

In substances which undergo an oxidation-reduction reaction, those which are of good reflectance exhibit small absorptance to the external energy, such as the laser beam, because they are of good reflectance. Consequently, it is believed that they absorb energies less which are required for the reaction. Therefore, it is necessary to make both of the substances a combination of good reactivity. Even if such is the case, both of the substances react, for example, in the formation of the recording film or when the external energy is not applied. Hence, there still is a large possibility of reducing the modulation.

Whereas, in the aforementioned preferred embodiment, the first and second substances are made into a combination of good reactivity by controlling the oxygen-bonding energy, the oxygen-dissociating energy, etc. It is possible, however, to suppress the reaction between the first and second substances, reaction which degrades the recording characteristics other than the case where information is recorded, by the interposing third substance (the hydrocarbon film 30 in the preferred embodiment). Accordingly, it is possible to exhibit modulations of favorable values (for example, as set forth in FIG. 2 and FIG. 3, 80% or more).

(Third Preferred Embodiment)

In the optical disk 100 illustrated in FIG. 1, this Third Preferred Embodiment differs from the recording medium of the aforementioned First Preferred Embodiment in that the first layer is an In-3.2 atomic % Ag film 400 instead of the Sn-10 atomic % Sr film, and in that the barrier layer is a Ti film 300 instead of the C film. The recording medium of this preferred embodiment operates and effects advantages in the substantially same manner as the recording medium of the aforementioned First Preferred Embodiment. Hereinafter, the portions, which differ from those of the recording medium of the First Preferred Embodiment, will be described mainly.

The manufacturing method of the recording medium of this preferred embodiment will be described with reference to a specific example.

On the surface 1b of the substrate 1, the $WO_3$ film 2 was formed in a thickness of 175 nm by an RF magnetron sputtering method with a $WO_3$ target under the following film forming conditions of sputtering gas species: Ar+10% $O_2$, sputtering gas pressure: $4 \times 10^{-3}$ Torr and input electric power: 100–400 W.

Subsequently, the Ti film 300 was formed in a thickness of 1 nm by an RF magnetron sputtering method with a Ti target under the following film forming conditions of sputtering gas species: Ar, sputtering gas pressure: $4 \times 10^{-3}$ Torr and input electric power: 100–200 W.

Still subsequently, the In-3.2 atomic % Ag film 400 was formed in a thickness of 45 nm by an RF magnetron sputtering method with an In-3.2 atomic % Ag target under the following film forming conditions of sputtering gas species: Ar, sputtering gas pressure: $4 \times 10^{-3}$ Torr and input electric power: 50–200 W.

Finally, the ultraviolet-curable resin was applied by a spin coating method. The ultraviolet-curable resin was cured using a high-pressure mercury-vapor lamp to form the resin film 5. Thus, the optical disk 100 was manufactured.

The recording actions of the optical disk 100 according to this preferred embodiment are assumed to be as follows. In the portion of the guide groove 1c, the recording laser beam enters (irradiates) in the direction of the arrow "A", and is focused on the surface of the In-3.2 atomic % Ag film 400. Since the melting point of the In-3.2 atomic % Ag is as low as about 141° C., a part of or all of the In-3.2 atomic % Ag film 400, which is irradiated with the laser beam, melts. In a certain case, holes are formed in the In-3.2 atomic % Ag film 400 in this instance.

Simultaneously therewith, the $WO_3$ film 2 and the In-3.2 atomic % Ag film 400, a part of or all of which melts, undergo a chemical reaction with the $WO_3$ and the In-3.2 atomic % Ag passing through the Ti film 300 and/or destroying the Ti film 300. Accordingly, the optical characteristics (reflectance, etc.) of the recording film vary so that information can be recorded. Since the chemical reaction occurs between the molten liquid and the solid, the reaction occurs more easily than the case where the reaction occurs between a solid and the other solid.

When the recording laser beam is not irradiated, since the Ti film 300 is interposed between the $WO_3$ film and the In-3.2 atomic % Ag film 400, the reaction between the $WO_3$ film 2 and the In-3.2 atomic % Ag film 400 is suppressed. As a result, the recording characteristics can be inhibited from degrading.

The reaction between the $WO_3$ film 2 and the In-3.2 atomic % Ag film 400 herein is also an oxidation-reduction reaction in a wide sense as hereinafter described. By irradiating with the recording laser beam, the $WO_3$, forming the film 2, is reduced, and a part of or all of it is turned into $WO_{2.83}$. The In-3.2 atomic % Ag, forming the film 400, is oxidized, and mainly a part of or all of In is chiefly turned into $In_2O_{3-x}$.

At this moment, the color hues of the substances constituting the films are as follows. The $WO_3$ is transparent, the $WO_{2.83}$ is blue, the In-3.2 atomic % Ag is metallic gloss, and the $In_2O_{3-x}$ is black. Accordingly, the optical characteristics of the optical disk 100 before and after recording vary greatly.

The energy required for the $WO_3$ to dissociate oxygen molecules in an amount of 1 mol and to turn into the $WO_{2.83}$ (oxygen-dissociating energy) is about 480 kJ at room temperature. The energy generated by the In to bond with oxygen molecules in an amount of 1 mol and to turn into the $In_2O_{3-x}$ (oxygen-bonding energy) is about 640 kJ at room temperature. Here, the oxygen-bonding energy required for Ag to turn into $Ag_2O$ is about 130 kJ at room temperature.

This preferred embodiment also exhibits the same recording action in the same manner as that of the aforementioned Second Preferred Embodiment. Moreover, in this preferred embodiment as well, since the aforementioned oxidation-reduction reaction is an exothermic reaction, the modified reaction products ($WO_{2.83}$ and $In_2O_{3-x}$) are stable energetically, and the reverse reaction is less likely to occur. In addition, since the substances before the generation or after the generation are the oxides or the substance containing oxygen as a constituent element, they are strong against heat and moisture, etc., and are good in environmental resistance. Thus, when information is not recorded, it is likely to suppress the unnecessary reactions.

In the optical disk 100, information was recorded by irradiating with a laser beam (recording laser beam) of wavelength: 780 nm from the side of the flat surface (surface 1a), which was focused on the surface of the In-3.2 atomic % Ag film 400 through an objective lens of NA (numerical aperture): 0.5. At this moment, the irradiating conditions were linear velocity: 2.8 m/sec, recording frequency: 400 kHz and recording laser wave form: rectangular wave of 50% duty ratio. The characteristics (recording characteristics) of the optical disk in this instance were, as set forth in FIG. 4, reflectance at unrecorded portions: 63%, recording laser power: 7 mW, C/N: 52 dB and modulation: 93%.

Figure 4:
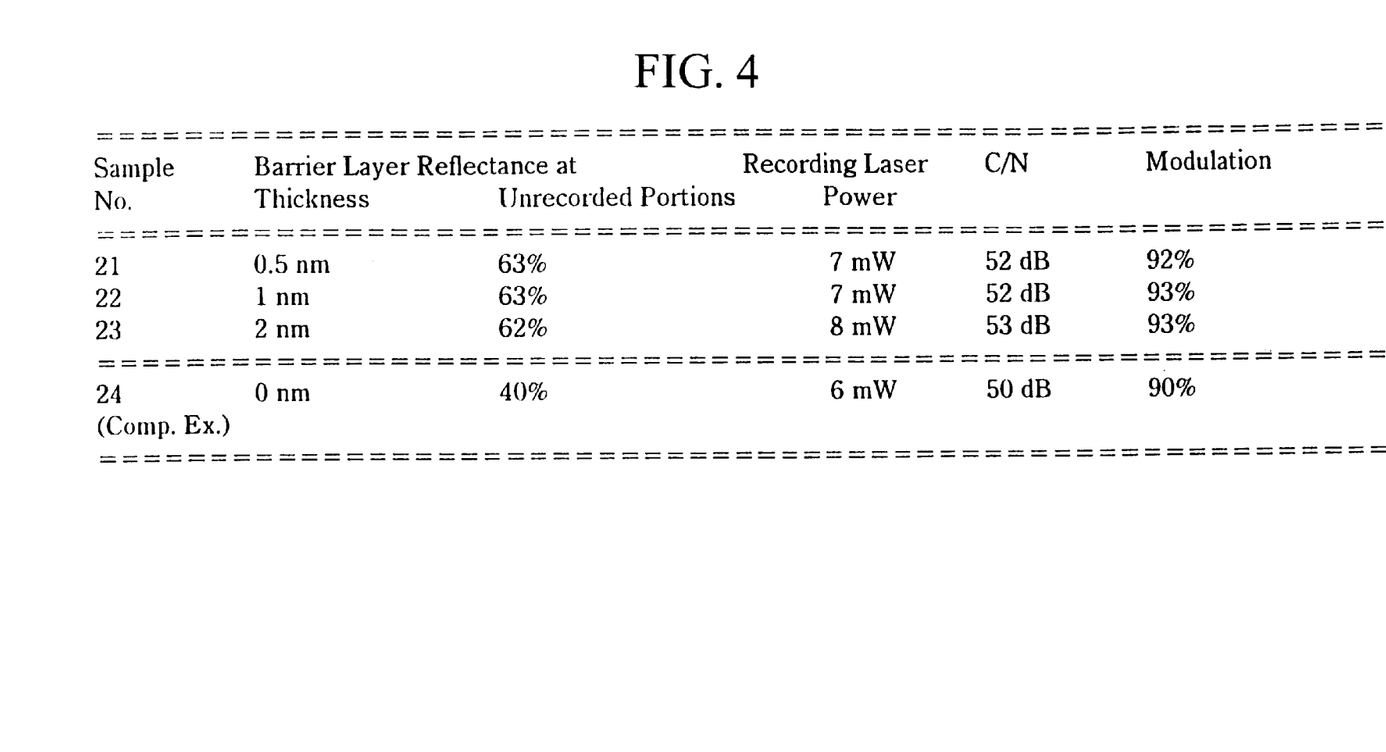
FIG. 4 is a table for summarizing the recording characteristics of optical disks of a Third Preferred Embodiment and a comparative example.

Then, the optical disk characteristics as set forth above were measured by variously changing the thickness of the Ti film 300 playing the role of the barrier layer (Sample Nos. 21 and 23), and FIG. 4 summarizes the results, together with the aforementioned results (Sample No. 22). Note that, in FIG. 4, Sample No. 24 was a comparative example to the present invention, and was free from the barrier layer.

As set forth in FIG. 4, it is understood that the optical disks 100 of this preferred embodiment listed as Sample Nos. 21 through 23 exhibited remarkably higher reflectance than the optical disk of the comparative example (Sample No. 24), and that they were well balanced in terms of the characteristics, such as the reflectance, the recording power, the C/N and the modulation. This results from the arrangement that the reaction between the first layer, the In-3.2 atomic % Ag film 400, and the second layer, the $WO_3$ film 2, is suppressed especially in the formation of the films.

Moreover, the respective optical disks of Sample Nos. 21 through 24 were subjected to an environmental resistance test which was carried out at 55° C. for 96 hours. The optical disks of this preferred embodiment could read out the recorded data. Whereas, it was impossible for the optical disk of the comparative example to read out the recorded data. This results from the arrangement that the reaction between the $WO_3$ film 2 and the In-3.2 atomic % Ag film 400 is suppressed by the presence of the Ti film 300.

As described so far, the optical disks this preferred embodiment are characterized in that they are better balanced in terms of the characteristics, such as the reflectance, the recording power, the C/N and the modulation, than the conventional optical disk.

Moreover, in this preferred embodiment, since the Ti film 300 is interposed between the $WO_3$ film 2 and the In-3.2 atomic % Ag film 400, the reaction is suppressed in the formation of the films, under ordinary environment, and under the high-temperature-and-high humidity conditions such as the aforementioned environmental resistance test. Thus, the reflectance (initial reflectance) at the unrecorded portions of the optical disk can be heightened remarkably. In addition, the recording characteristics (reflectance, recording powder, C/N and modulation) can be inhibited from degrading, and the data retention characteristic can be improved greatly.

Note that the metal employed as the barrier layer (Ti film 300 in this preferred embodiment) can preferably exhibit a thermal diffusion coefficient of 50 mm²/sec or less in bulk. When the metal exhibits a thermal diffusion coefficient of 50 mm²/sec or more, a laser beam power, which is applied when recording information, should be increased. Accordingly, such a metal is not so practical for a recording medium. Also note that, in the Ti film 300 employed as the barrier layer in this preferred embodiment, Ti exhibits a thermal diffusion coefficient value of about 9.3 mm²/sec in bulk (at room temperature), that Ti generates an energy of about 1,070 kJ when it bonds with oxygen molecules in an amount of 1 mol, and that Ti has a melting point of 1,675° C.

Further, in the aforementioned optical disk 100, the first, second and third layers, constituting the recording film, cannot necessarily consist of the first, second and third substances only, respectively. The first, second and third substances can be mixed with other substances to form the respective layers.

Furthermore, the optical disk can comprise a laminated construction of the first layer and the second layer; the first layer can be constituted by the third substance coexisting with one of the first substance and the second substance; and the second layer can comprise the other one of the first substance and the second substance which is not contained in the first layer.

Moreover, the recording film cannot necessarily be the aforementioned laminated construction. It can be a single-layered construction in which the third substance interposes between the first and second substances in one layer. In addition, since the major portion of the present invention exists in the recording film, the constituent elements other than the recording film can be designed alternatively at one's discretion.

Whilst, the recording medium, to which the present invention is applied, is not limited to the form of the aforementioned optical disk, but can have other forms. Additionally, the external energy, which induces the reaction to vary the optical characteristics, is not limited to the laser beam, but can be light in general, heat, electromagnetic wave, sound wave, radiation, impact force, strain, etc. For example, the present invention can be applied to a thermo label, or the like, in which the first substance and the second substance undergo an oxidation-reduction reaction at a predetermined temperature to vary the optical characteristics so that information is recorded.

What is claimed is:

1. A recording medium for recording information by varying optical characteristics thereof by applying an external energy thereto, wherein the recording medium comprises:
    a substrate;
    a first substance and a second substance, supported on said substrate, which causes an exothermic reaction to vary optical characteristics of said first and second substances when the external energy is applied, said first substance undergoing oxidation and being at least one member selected from the group consisting of metals that exhibit a melting point of from 100 to 300° C., and intermetallic compounds, nitrides, carbides, silicides, borides, sulfides, selenides, tellurides, phosphides, arsenides, antimonides and substances containing the members that exhibit a melting point or a decomposition temperature of from 100 to 300° C., wherein said member generates an energy of 500 kJ or more when bonding with oxygen molecules in an amount of 1 mol, said second substance undergoing reduction and being at least one member selected from the group consisting of oxides, substances containing oxygen as a constituent element, substances with oxygen adsorbed, compounds thereof and mixtures thereof; and
    a third substance interposed between said first substance and said second substance, enabling said first substance and said second substance to react when said external energy is applied, and suppressing said first substance and said second substance to react when said external energy is not applied.

2. The recording medium according to claim 1, wherein said second substance requires an energy of 550 kJ or less when dissociating oxygen molecules in an amount of 1 mol.

3. The recording medium according to claim 1, wherein said oxides, said substances containing oxygen as a constituent element, said substances with oxygen adsorbed, said compounds thereof and said mixtures thereof contain at least one element selected from the group consisting of elements of group 6 of the periodic table of the elements, elements of group 8 thereof, elements of group 9 thereof, elements of group 11 thereof, Ti, V, Mn, Ni, Re, Ge, Sn, Pb, As, Sb, Bi, Se, Te, Ce, Pr and Tb.

4. The recording medium according to claim 1, wherein said second substance is at least one oxide selected from the group consisting of $MoO_3$, $ReO_2$, $PrO_2$ and $SbO_2$.

5. The recording medium according to claim 1, wherein said second substance is $WO_3$.

6. The recording medium according to claim 1, wherein said first substance is at least one member selected from the group consisting of Au—Ag—Sn alloys, Au—Ga—Sn alloys and In—Sn alloys.

7. The recording medium according to claim 1, wherein said first substance is an Sn-43 atomic % Bi alloy.

8. The recording medium according to claim 1, wherein said third substance is at least one member selected from the group consisting of oxides, substances containing oxygen as a constituent element, substances with oxygen adsorbed, and compounds thereof or mixtures thereof, which generate a quantity of heat in excess of 550 kJ when dissociating oxygen molecules in an amount of 1 mol.

9. The recording medium according to claim 8, wherein said oxide is $Al_2O_3$ or SiAlON.

10. The recording medium according to claim 1, wherein said third substance is an organic substance which exhibits a decomposition, sublimation or melting temperature of 300° C. or less.

11. The recording medium according to claim 10, wherein said organic substance is $C_mH_n$, $C_mF_n$ or $C_mH_nF_p$, wherein m, n and p are integers.

12. The recording medium according to claim 1, wherein said third substance is a substance including at least one member selected from the group consisting of metals, semiconductors, intermetallic compounds, nitrides, carbides, silicides, borides, sulfides, selenides, tellurides, phosphides, arsenides, antimonides and substances containing the members, which exhibit a thermal diffusion coefficient of 50 mm²/sec or less in bulk at room temperature.

13. The recording medium according to claim 12, wherein said third substance is at least one member selected from the group consisting of Mn, Ti, Se, Mn steels, titanium alloys, Si, Ge and $SiN_x$.

14. The recording medium according to claim 1, wherein said third substance is carbon.

15. The recording medium according to claim 1, wherein said third substance is a hydrocarbon resin.

16. The recording medium according to claim 1, wherein said third substance is titanium.

17. The recording medium according to claim 1, wherein said first substance, said second substance and said third substance are formed as a layer, respectively, and are laminated with a layer including the third substance in the middle.

18. The recording medium according to claim 1, wherein the third substance exhibits a melting point, a decomposition temperature or a sublimation temperature of 1,000° C. or more in the case where the third substance generates an energy of 1,000 kJ or more when bonding with oxygen molecules in an amount of 1 mol; or exhibits a melting point, a decomposition temperature or a sublimation temperature of 300° C. or more in the case where the third substance generates an energy of less than 1,000 kJ when bonding with oxygen molecules in an amount of 1 mol.

19. The recording medium according to claim 1, wherein said third substance is in a form of a layer, and has a thickness of 0.5 nm or more.

20. A recording medium for recording information by varying optical characteristics thereof by applying an external energy thereto, wherein the recording medium comprises:
   a substrate;
   a first substance and a second substance, supported on said substrate, which cause an exothermic reaction to vary optical characteristics of said first and second substances when the external energy is applied, said first substance undergoing oxidation and being at least one member selected from the group consisting of intermetallic compounds, nitrides, carbides, silicides, borides, sulfides, selenides, tellurides, phosphides, arsenides, antimonides and substances containing the members, which generate an energy of 1,000 kJ or more when bonding with oxygen molecules in an amount of 1 mol, said second substance undergoing reduction and being at least one member selected from the group consisting of oxides, substances containing oxygen as a constituent element, substances with oxygen adsorbed, compounds thereof, and mixtures thereof; and
   a third substance interposed between said first substance and said second substance, enabling said first substance and said second substance to react when said external energy is applied, and suppressing said first substance and said second substance to react when said external energy is not applied.

21. The recording medium according to claim 20, wherein said second substance requires an energy of 550 kJ or less when dissociating oxygen molecules in an amount of 1 mol.

22. The recording medium according to claim 20, wherein said oxides, said substances containing oxygen as a constituent element, said substances with oxygen adsorbed, said compounds thereof and said mixtures thereof contain at least one element selected from the group consisting of elements of group 6 of the periodic table of the elements, elements of group 8 thereof, elements of group 9 thereof, elements of group 11 thereof, Ti, V, Mn, Ni, Re, Ge, Sn, Pb, As, Sb, Bi, Se, Te, Ce, Pr and Tb.

23. The recording medium according to claim 20, wherein said second substance is at least one oxide selected from the group consisting of $MoO_3$, $ReO_2$, $PrO_2$ and $SbO_2$.

24. The recording medium according to claim 20, wherein said second substance is $WO_3$.

25. The recording medium according to claim 20, wherein said first substance is an Sn-10 atomic % Sr alloy.

26. The recording medium according to claim 20, wherein said third substance is at least one member selected from the group consisting of oxides, substances containing oxygen as a constituent element, substances with oxygen adsorbed, compounds thereof, and mixtures thereof, which generate a quantity of heat in excess of 550 kJ when dissociating oxygen molecules in an amount of 1 mol.

27. The recording medium according to claim 26, wherein said oxide is $Al_2O_3$ or SiAlON.

28. The recording medium according to claim 20, wherein said third substance is an organic substance which exhibits a decomposition, sublimation or melting temperature of 300° C. or less.

29. The recording medium according to claim 28, wherein said organic substance is $C_mH_n$, $C_mF_n$ or $C_mH_nF_p$, wherein m, n and p are integers.

30. The recording medium according to claim 20, wherein said third substance is a substance including at least one member selected from the group consisting of metals, semiconductors, intermetallic compounds, nitrides, carbides, silicides, borides, sulfides, selenides, tellurides, phosphides, arsenides, antimonides and substances containing the members, which exhibit a thermal diffusion coefficient of 50 $mm^2$/sec or less in bulk at room temperature.

31. The recording medium according to claim 30, wherein said third substance is at least one member selected from the group consisting of Mn, Ti, Se, Mn steels, titanium alloys, Si, Ge and $SiN_x$.

32. The recording medium according to claim 20, wherein said third substance is carbon.

33. The recording medium according to claim 20, wherein said third substance is a hydrocarbon resin.

34. The recording medium according to claim 20, wherein said third substance is titanium.

35. The recording medium according to claim 20, wherein said first substance, said second substance and said third substance are formed as a layer, respectively, and are laminated with a layer including the third substance in the middle.

36. The recording medium according to claim 20, wherein the third substance exhibits a melting point, a decomposition temperature or a sublimation temperature of 1,000° C. or more in the case where the third substance generates an energy of 1,000 kJ or more when bonding with oxygen molecules in an amount of 1 mol; or exhibits a melting point, a decomposition temperature or a sublimation temperature 300° C. or more in the case where the third substance generates an energy of less than 1,000 kJ when bonding with oxygen molecules in an amount of 1 mol.

37. The recording medium according to claim 20, wherein said third substance is in a form of a layer, and has a thickness of 0.5 nm or more.

* * * * *